US010001163B1

(12) United States Patent
Elterman

(10) Patent No.: US 10,001,163 B1
(45) Date of Patent: Jun. 19, 2018

(54) BALL JOINT WITH IMPROVED UPPER BEARING AND METHOD OF CONSTRUCTION THEREOF

(71) Applicant: Federal-Mogul Motorparts Corporation, Southfield, MI (US)

(72) Inventor: James Elterman, Byrnes Mill, MO (US)

(73) Assignee: Federal-Mogul Motorparts, LLC, Southfield, MI (US)

(*) Notice: Subject to any disclaimer, the term of this patent is extended or adjusted under 35 U.S.C. 154(b) by 0 days. days.

(21) Appl. No.: 15/388,135

(22) Filed: Dec. 22, 2016

(51) Int. Cl.
*F16C 11/06* (2006.01)
*F16C 33/20* (2006.01)
*F16C 43/02* (2006.01)

(52) U.S. Cl.
CPC ........ F16C 11/0633 (2013.01); F16C 11/068 (2013.01); F16C 33/201 (2013.01); *B60G 2204/416* (2013.01); *F16C 43/02* (2013.01); *F16C 2208/02* (2013.01); *F16C 2220/04* (2013.01); *Y10T 29/49648* (2015.01); *Y10T 403/32737* (2015.01)

(58) Field of Classification Search
CPC .......... B62D 7/16; B62D 7/166; B60G 7/005; B60G 2204/416; F16C 11/06–11/086; F16C 33/201; F16C 33/22; F16C 2208/02; F16C 2208/04; F16C 2220/04; F16C 43/02; Y10T 29/49648; Y10T 403/32631; Y10T 403/32729; Y10T 403/32737; Y10T 403/32762; Y10T 403/32771; Y10T 403/32786; Y10T 403/32795; Y10T 403/32803
USPC ....... 403/122, 134, 135, 138, 139, 141–143; 280/93.51, 93.511; 29/898.043
See application file for complete search history.

(56) References Cited

U.S. PATENT DOCUMENTS

| 3,650,004 | A | 3/1972 | Bergstrom |
| 5,496,125 | A | 3/1996 | Maughan |
| 5,564,853 | A | 10/1996 | Maughan |
| 5,607,249 | A | 3/1997 | Maughan |

(Continued)

FOREIGN PATENT DOCUMENTS

| DE | 10236829 A1 | 2/2004 |
| EP | 2336582 A1 | 6/2011 |
| EP | 2642141 A1 | 9/2013 |
| EP | 3101290 A1 | 12/2016 |

(Continued)

OTHER PUBLICATIONS

"Color Pigments and Dyes." Industrial Polymers Corporation. Dec. 12, 2011, [online], [retrieved on Jun. 26, 2014]. Retrieved from the Internet <URL: https://web.archive.org/web/20111212073639/ http://www.industrialpolymers.com/product-list/color-pigments-and-dyes/color-pigments-and-dyes/>.*

(Continued)

Primary Examiner — Josh Skroupa
(74) Attorney, Agent, or Firm — Robert L. Stearns; Dickinson Wright, PLLC

(57) ABSTRACT

A ball joint for interconnecting relatively movable components includes a housing and a stud with a spherical bearing surface disposed in the housing. The bearing has a concave spherical bearing surface which is brought into sliding abutment with the spherical. bearing surface of the stud. The bearing is of a monolithic piece of fiber-reinforced polyoxyinethylene material and includes carbon fibers which extend circumferentially about the concave spherical bearing surface.

20 Claims, 2 Drawing Sheets

(56) References Cited

U.S. PATENT DOCUMENTS

| | | | |
|---|---|---|---|
| 5,609,433 A | 3/1997 | Pazdirek et al. | |
| 5,704,727 A | 1/1998 | Atkins et al. | |
| 5,713,689 A | 2/1998 | Pazdirek et al. | |
| 5,772,337 A | 6/1998 | Maughan et al. | |
| 6,505,989 B1 | 1/2003 | Pazdirek et al. | |
| 7,322,769 B2 * | 1/2008 | Heuser | F16C 11/0638 403/135 |
| 8,550,741 B2 * | 10/2013 | Kuroda | F16C 11/0685 403/135 |
| 9,316,250 B2 | 4/2016 | Elterman et al. | |
| 2004/0264821 A1 | 12/2004 | Budde | |
| 2013/0234412 A1 | 9/2013 | Kuroda | |
| 2016/0341244 A1 | 11/2016 | Tonomori et al. | |

FOREIGN PATENT DOCUMENTS

| | | |
|---|---|---|
| JP | H01126416 A | 5/1989 |
| JP | H10151931 A | 6/1998 |
| WO | 2014052346 A1 | 4/2014 |
| WO | 2017159822 A1 | 9/2017 |

OTHER PUBLICATIONS

"Why (and What) You Need to Dry." Plastics Technology. Aug. 20, 2014, [online], [retrieved on Oct. 5, 2017] Retrieved from the Internet <URL: https://web.archive.org/web/20140820065922/ http://www.ptonline.com/articles/why-and-what-you-need-to-dry>.*

International Search Report, dated Mar. 9, 2018 (PCT/US2017/ 068068).

* cited by examiner

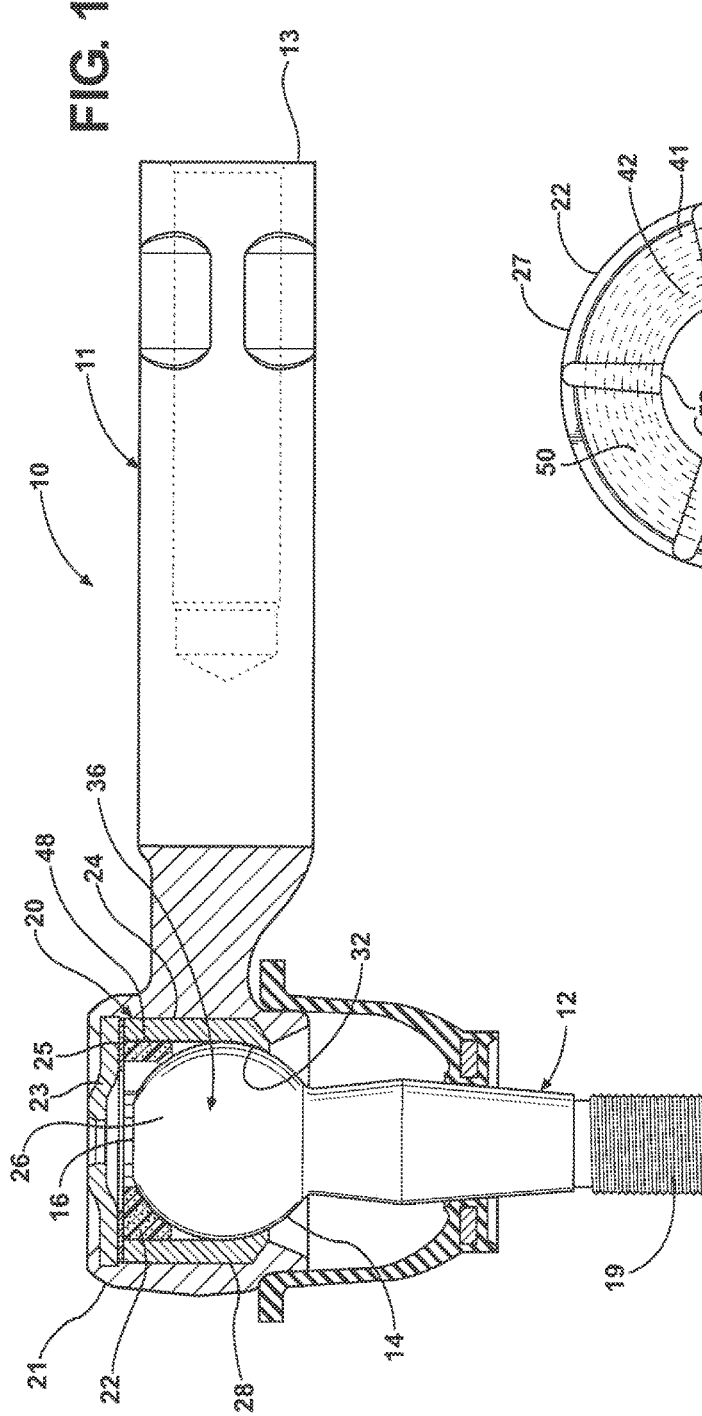
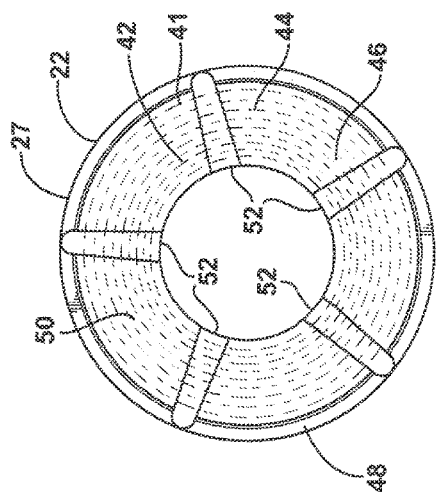

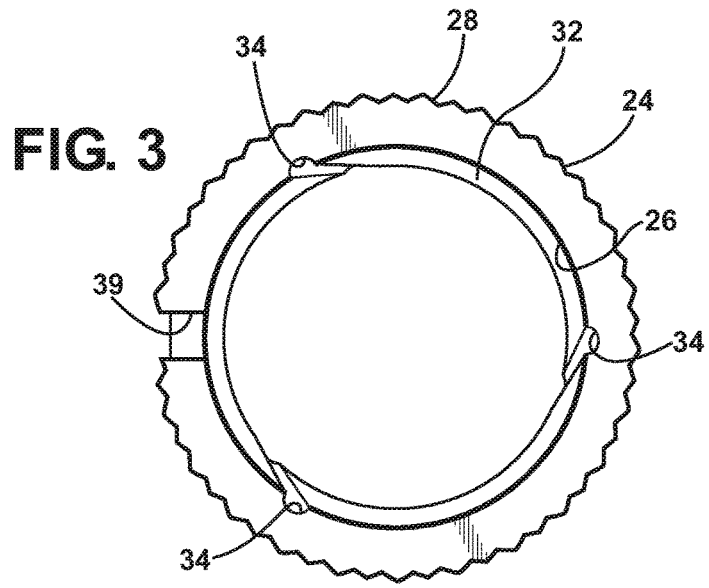
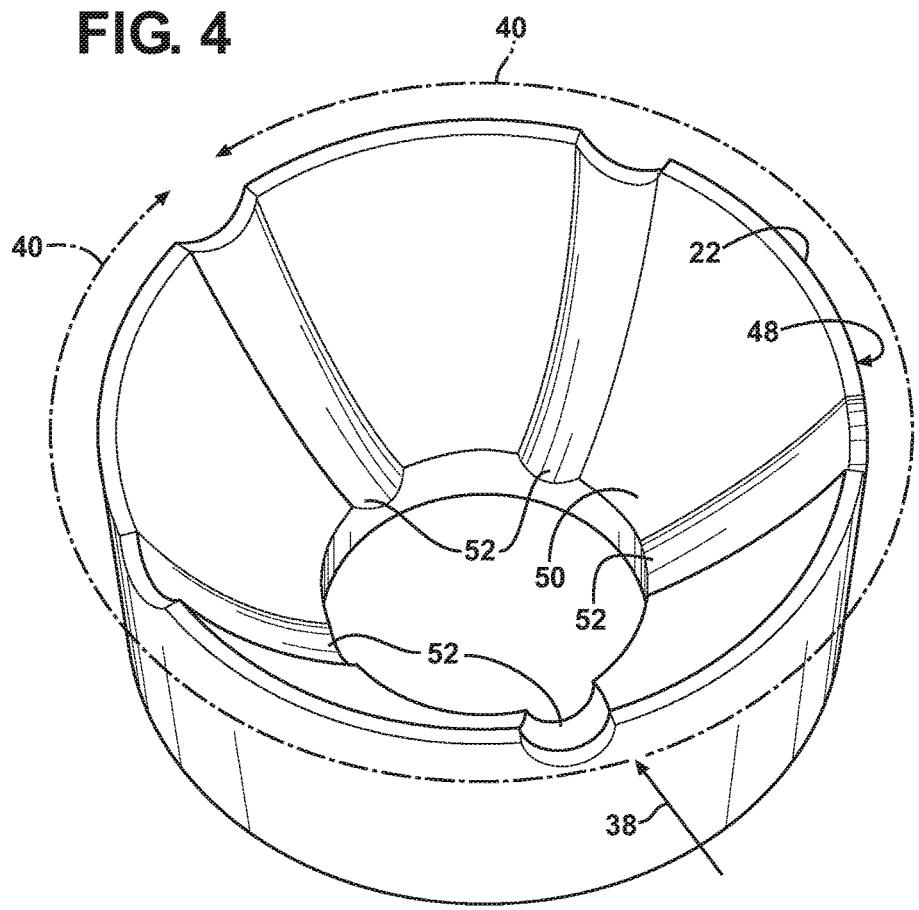

BALL JOINT WITH IMPROVED UPPER BEARING AND METHOD OF CONSTRUCTION THEREOF

BACKGROUND OF THE INVENTION

1. Technical Field

This invention relates generally to joints for linking relatively movable vehicle steering components to one another, such as ball joints, tie rod ends, and sway bar links.

2. Related Art

Vehicle suspension systems and steering systems typically include joints, such as tie rod end ball-type joints for operable attachment of a tie rod end to a steering knuckle and a ball joint for coupling the steering knuckle to a control arm. In addition, other applications, such as carnival rides or any other mechanism with relatively movable joints, typically have ball joints to facilitate the relative movement between linked components. Such ball joints typically include one or more bearings that are received in a housing and a ball stud that slidably contacts the bearing or bearings to allow the housing and ball stud to articulate relative to one another during use.

Upon assembly of ball joints, it is generally desirable to build in a frictional resistance between the ball stud and housing that is within a predetermined torque tolerance. In addition, it is essential that the ball joints exhibit a long and useful life, and of additional importance, it is important that the ball joints be economical in manufacture. If the frictional resistance or torque is too high, it may impede the motion of the mechanism and/or make installation difficult. If the frictional resistance is too low, it may result in an undesirable "out-of-box feel" to which the installer of the joint will believe the socket to have excessive looseness, and therefore, shorter operating life.

It is known to construct ball joints from metal, including coated metal bearings against which the metal ball stud pivots. However, although the coated metal bearings can provide a desirable "out-of-box" feel and exhibit a long and useful life, they typically come at a high cost in manufacture.

In an effort to reduce costs associated with manufacture, it is known to construct tie rod end ball joints with glass-filled nylon or fiber-reinforced nylon bearings against which a metal ball stud pivots. Although the cost of manufacture is greatly reduced, the glass-filled nylon bearings provide a reduced useful life as compared to metal bearings.

During manufacture of such socket assemblies, prior to molding a nylon bearing, the nylon resin must be sufficiently dried to remove any water from the nylon resin and minimize water in the socket assembly that could corrode the metal ball stud. Even with this drying operation, the metal ball studs of socket assemblies with nylon bearings are coated with a corrosion resistant material for further corrosion protection as water often inevitably finds its way into the socket assembly, if not during assembly, then during use.

SUMMARY OF THE INVENTION

According to one aspect of the present invention, a ball joint socket is provided including a housing with a stud having a spherical bearing surface disposed in the housing and including a bearing having a concave spherical bearing surface brought into sliding abutment with the spherical bearing surface of the stud. The bearing is of a monolithic piece of fiber-reinforced polyoxymethylene material including carbon fibers which extend circumferentially about the concave spherical bearing surface.

The use of the fiber-reinforced polyoxymethylene material including carbon fibers which extend circumferentially about the concave spherical bearing surface has been found to provide unexpected results in the form of reduced manufacturing expenses. Specifically, the fiber-reinforced polyoxymethylene material has been found to resist water to such a degree that the bearing does not have to be dried prior to injection molding of the bearing. Accordingly, not only are are manufacturing time and costs both reduced, but the use of less complex molding equipment without drying capabilities is possible.

The use of fiber-reinforced polyoxymethylene for the bearing also provides the socket assembly with increased operative life. During use, water often inevitably finds its way into the socket assembly. Because the polyoxymethylene does not absorb water, each regreasing of the socket assembly flushes out any water that has found its way into the interior of the socket assembly. By comparison, the material of nylon bearings has a tendency to absorb any water in the socket assembly such that it cannot be flushed out of the socket assembly during regreasing. If the ball of the stud develops corrosion as a result of contact with water, the corrosion acts as an abrasive and increases the wear rate of bearing surfaces.

In accordance with another aspect of the present invention, the stud is made of metal, and the spherical bearing surface is uncoated. The water resistance of the polyoxymethylene bearing, which allows any water in the socket assembly to be flushed out of the socket assembly during regreasing, has been found to be sufficient to allow the use of an uncoated metal stud without compromising operative life. The use of an uncoated stud further reduces the manufacturing expense of the socket assembly.

In accordance with another aspect of the present invention, the fiber-reinforced polyoxymethylene material includes glass fibers which extend circumferentially about the concave spherical bearing surface.

In accordance with yet another aspect of the invention, the fiber-reinforced polyoxymethylene material has a composition including greater than about 57% polyoxymethylene; greater than 0% and less than about 30% glass fiber; greater than 0% and less than about 10% carbon fiber, and greater than 0% and less than about 10% bronze flake.

In accordance with still another aspect of the invention, the fiber-reinforced polyoxymethylene material includes greater than 0% and less than about 3% white pigment.

In accordance with a further aspect of the invention, the ball joint socket is a provided in a tie rod end.

In accordance with another aspect of the invention, a method of constructing a ball joint socket is provided. The method includes inserting a bearing constructed as a monolithic piece of fiber-reinforced polyoxymethylene material including carbon fibers which extend circumferentially about a concave spherical bearing surface of the bearing into a metal housing and bringing the concave spherical bearing surface into sliding abutment with a metal spherical bearing surface of a stud.

In accordance with yet another aspect of the invention, the method includes the step of providing the fiber-reinforced polyoxymethylene material including glass flakes both of which extend circumferentially about a concave spherical bearing surface.

In accordance with still another aspect of the invention, the method includes the step of providing the fiber-reinforced polyoxymethylene material with a composition including greater than about 57% polyoxymethylene; greater than 0% and less than about 30% glass fiber; greater than 0% and less than about 10% carbon fiber, and greater than 0% and less than about 10% bronze flake.

In accordance with another aspect of the invention, the method includes the step of providing the fiber-reinforced polyoxymethylene material with greater than 0% and less than about 3% white pigment.

In accordance with another aspect of the invention, the method includes the step of inserting the ball joint socket in a tie rod end.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 1 is a cross-sectional view of a tie rod end including a ball joint socket constructed in accordance with one presently preferred aspect of the invention;

FIG. 2 is a plan view of an upper bearing of the ball joint socket of FIG. 1 constructed in accordance with one aspect of the invention;

FIG. 3 is a plan view of a lower bearing of the ball joint socket of FIG. 1; and FIG. 4 is a perspective and elevation view of the upper bearing of the ball joint socket of FIG. 1 and showing a direction of a flow of material during an injection molding process.

DETAILED DESCRIPTION OF PRESENTLY PREFERRED EMBODIMENTS

Referring in more detail to the drawings, FIG. 1 illustrates a ball joint 10, shown by way of example as an outer tie rod end ball-type joint assembly, referred to hereafter as tie rod end 10, constructed in accordance with one exemplary embodiment of the present invention. The tie rod end 10 has a tie rod housing 11 with an end 13 configured for attachment to an inner steering component (not shown), such as an inner tie rod assembly via an adjuster, for example. The tie rod end 10 also includes a stud 12 which has a spherical bearing surface 14 at one end, represented substantially as a ball 14, and has an opposite end 18 configured for attachment to a vehicle steering member (not shown), such as by threads 19, for example. The vehicle steering member could be, for example, a steering knuckle (not shown) of a vehicle.

The tie rod end 10 further includes a ball socket assembly, referred to hereafter as socket assembly 20, with an upper (or first) bearing 22 and a lower (or second) bearing 24. The upper and lower bearings 22, 24 are configured for sliding engagement with the spherical bearing surface 14 of the stud 12. In use, the loading between the spherical bearing surface 14 of the stud 12 and the socket assembly 20 is radial or substantially radial, such as between about 400 to 1500 lbs, while the axial loading imparted on the tie rod end 10 in use is negligible. In the exemplary embodiment, a desired preload on the spherical bearing surface 14 of the stud 12 is established during assembly by roll forming or folding an end of a socket 21 of the tie rod housing 11 about an end cap 23 with a spring washer 25 being captured between the upper bearing 22 and the end cap 23. The upper and lower bearings 22, 24 have spherical bearing surfaces which are configured to slidingly engage opposite sides of the spherical bearing surface 14 of the stud 12.

The heavily loaded lower bearing 24 can be provided, for example, as a standard metal bearing and can further be coated with a low-friction coating 26. The lower bearing 24 can be constructed of any suitable hardened metal, such as a sintered powder metal, for example.

The lower bearing 24 of the exemplary embodiment has an outer cylindrical wall 28 which extends between opposite ends, and the wall 28 is sized suitably for receipt in the housing or socket 21 of the tie rod 11. The lower bearing 24 has a substantially concave spherical bearing surface 32 with a generally similar spherical curvature as the spherical bearing surface 14 of the stud 12 for sliding abutment therewith. As best shown in FIG. 3, the lower bearing 24 of the exemplary embodiment has a plurality of lubrication grooves 34 which extend radially into the bearing surface 32. The grooves 34 extend between and through the opposite ends of the lower bearing 24 and function primarily to transfer lubricant, such as grease, for example, to prevent pressurization of the lubricant within the socket assembly 20 and to reduce friction between the bearings 22, 24 and the spherical bearing surface 14 of the stud 12, thereby extending the useful life of the tie rod end 10. It should be understood that the grooves 34 can be formed with a multitude of shapes and depths, as desired.

The stud 12 may be constructed from any suitable metal, such as AISI 4140 steel, for example. The spherical bearing surface 14 is represented here as being generally spherical in shape and is uncoated, i.e., free of any lubrication or corrosion resistance coatings.

The upper bearing 22 is constructed from a novel thermoplastic fiber-reinforced polyoxymethylene (POM) plastic 27 (also known as acetal, polyacetal and polyformaldehyde). Due to the novel thermoplastic fiber-reinforced POM, the upper bearing 22 exhibits a long and useful life, substantially comparable to a metal bearing; provides the tie rod end 10 with a desirable "out-of-box" feel and is economical in manufacture, being much less costly to make than a standard metal bearing, a nylon bearing or a fiber-reinforced bearing. As compared to a nylon bearing or a fiber-reinforced nylon bearing, the upper bearing 22 may be made using less complex molding equipment because a drying operation is not required prior to placing the upper bearing 22 in the housing 11.

In manufacture, the fiber-reinforced POM material of the upper bearing 22 is injection molded to provide the upper bearing 22 with its enhanced performance characteristics. Referring now to FIG. 4, during injection molding, the thermoplastic material flows through a sprue in a radial direction, represented generally at 38, whereupon the material flows circumferentially within the mold cavity, as represented generally by arrows 40, to form the geometric configuration of the upper bearing 22. As shown in FIG. 2, the fibers dispersed within the nylon 41 include carbon fibers 42, glass fibers 44 and bronze flakes 46. The fibers 42, 44, and flakes 46 are uniformly dispersed in the nylon 41, thereby providing the upper bearing 22 as a homogeneous or substantially homogeneous, solid monolithic piece of fiber-reinforced material 27, "as injection molded". The fiber-reinforced POM material 27 of the upper bearing 22 includes the following composition of the nylon and fibers: greater than about 57% POM 41; greater than 0% and less than about 30% glass fiber 44; greater than 0% and less than about 10% carbon fiber 42, and greater than 0% and less than about 10% bronze flake 46, and if desired for enhanced appearance, less than about 3% white pigment. The POM 41 provides strength and lubricity; the glass fibers 44 provide strength; the carbon fibers 42 provide strength and lubricity; and the bronze flakes 46 provide durability and enhanced appearance.

The upper bearing 22 has an outer cylindrical wall 48 which extends between opposite ends, and the wall 48 is sized suitably for receipt in the lower bearing 24. The upper bearing 22 has a substantially concave spherical bearing surface 50 having a generally similar spherical curvature as the spherical bearing surface 14 of the stud 12 for sliding abutment of the circumferentially extending fibers 42, 44, flakes 46 and POM 41 therewith. The upper bearing 22 is also shown as having a plurality of lubrication grooves 52 which extend radially into the bearing surface 50. The grooves 52 extend between and through the opposite ends of the upper bearing 22 and function primarily to transfer lubricant, such as grease, for example, to prevent pressurization of the lubricant within the bearing assembly 20 and to reduce friction between the bearing assembly 20 and the spherical bearing surface 14 of the stud 12, thereby extending the useful life of the tie rod end 10.

An exemplary method of constructing a ball joint 10 is provided. The exemplary method includes the step of injection molding a bearing 22 into a monolithic piece of fiber-reinforced POM material including carbon fibers 42 which extend circumferentially about a concave spherical bearing surface 50. The method continues with the step of inserting the bearing 22 into sliding abutment with a metal spherical bearing surface 14 of a stud 12. The bearing 22 may be injection molded to have a composition including greater than about 57% nylon 41; greater than 0% and less than about 30% glass fiber 44; greater than 0% and less than about 10% carbon fiber 42; and greater than 0% and less than about 10% bronze flake 46 with the glass fibers 44 and bronze flakes 46 both extending circumferentially about the concave spherical bearing surface 50.

Obviously, many modifications and variations of the present invention are possible in light of the above teachings. For example, as discussed above, it is contemplated that the spherical bearing surface 14 of the stud 12 could have grooves for channeling grease, with the upper and lower bearings 22, 24 being formed without grooves. It is, therefore, to be understood that within the scope of the appended claims, the invention may be practiced otherwise than as specifically described.

What is claimed is:

1. A ball joint, comprising:
a housing;
a stud having a spherical bearing surface disposed in said housing;
a bearing having a concave spherical bearing surface brought into sliding abutment with said spherical bearing surface of said stud; and
said bearing being a monolithic piece of fiber-reinforced polyoxymethylene material including carbon fibers which extend circumferentially about said concave spherical bearing surface.

2. The ball joint as set forth in claim 1 wherein said stud is made of metal and said spherical bearing surface of said stud is uncoated.

3. The ball joint as set forth in claim 1 wherein said fiber-reinforced polyoxymethylene material includes glass fibers extending circumferentially about said concave spherical bearing surface.

4. The ball joint as set forth in claim 3 wherein said fiber-reinforced polyoxymethylene material has a composition including greater than about 57% polyoxymethylene; greater than 0% and less than about 30% glass fiber; greater than 10% and less than about 10% carbon fiber, and greater than 0% and less than about 10% bronze flake.

5. The ball joint as set forth in claim 4 wherein said fiber-reinforced polyoxymethylene material includes greater than 0% and less than about 3% white pigment.

6. The ball joint as set forth in claim 1 wherein said bearing is an upper bearing and further including a lower bearing.

7. The ball joint as set forth in claim 6 wherein said upper bearing is received in said lower bearing.

8. The ball joint as set forth in claim 6 wherein at least one of said upper and lower bearings is provided with lubrication grooves.

9. The ball joint as set forth in claim 6 wherein said lower bearing is provided with a low-friction coating.

10. The ball joint as set forth in claim 6 further including an end cap and a washer spring captured between said upper bearing and said end cap.

11. The ball joint as set forth in claim 1 wherein said stud has an end with threads opposite of said spherical bearing surface.

12. The ball joint as set forth in claim 1 wherein said fiber-reinforced polyoxymethylene material includes individual carbon fibers which are substantially all substantially oriented in a circumferential direction.

13. A method of constructing a ball joint, comprising:
inserting a bearing constructed as a monolithic piece of fiber-reinforced polyoxymethylene material including carbon fibers extending circumferentially about a concave spherical bearing surface of the bearing into a metal housing and bringing the concave spherical bearing surface into sliding abutment with a metal spherical bearing surface of a stud.

14. The method as set forth in claim 13 wherein the metal spherical bearing surface of the stud is uncoated.

15. The method of claim 13 further including providing the fiber-reinforced polyoxymethylene material including glass fibers both extending circumferentially about the concave spherical bearing surface.

16. The method of claim 15 further including providing the fiber-reinforced polyoxymethylene material having a composition including greater than about 57% polyoxymethylene; greater than 0% and less than about 30% glass fiber; greater than 0% and less than about 10% carbon fiber, and greater than 0% and less than about 10% bronze flake.

17. The method of claim 15 further including providing the fiber-reinforced polyoxymethylene material includes greater than 0% and less than about 3% white pigment.

18. The method as set forth in claim 13 further including the step of injection molding the bearing before the step of inserting the bearing into sliding abutment with the metal spherical surface of the stud.

19. The method as set forth in claim 18 wherein the step of injection molding a bearing is done without drying a polyoxymethylene resin.

20. The method as set forth in claim 13 wherein the carbon fibers are substantially oriented in the polyoxymethylene material in a circumferential direction throughout the bearing.

* * * * *